(12) United States Patent  (10) Patent No.: US 8,325,282 B2
Mortensen  (45) Date of Patent: Dec. 4, 2012

(54) TELEVISION AUTOMATIC GEOMETRY ADJUSTMENT SYSTEM

(75) Inventor: Peter Mortensen, Tustin, CA (US)

(73) Assignee: Mitsubishi Electric Visual Solutions America, Inc., Irvine, CA (US)

( * ) Notice: Subject to any disclaimer, the term of this patent is extended or adjusted under 35 U.S.C. 154(b) by 1161 days.

(21) Appl. No.: 12/099,605

(22) Filed: Apr. 8, 2008

(65) Prior Publication Data

US 2009/0251620 A1  Oct. 8, 2009

(51) Int. Cl.
   *H04N 9/31*  (2006.01)
   *H04N 3/22*  (2006.01)

(52) U.S. Cl. ........................................ 348/744; 348/745

(58) Field of Classification Search .................. None
   See application file for complete search history.

(56) References Cited

U.S. PATENT DOCUMENTS

| | | | |
|---|---|---|---|
| 5,204,944 A | 4/1993 | Wolberg et al. | |
| 5,835,103 A | 11/1998 | Butler et al. | |
| 5,838,296 A | 11/1998 | Butler et al. | |
| 6,446,261 B1 | 9/2002 | Rosser | |
| 6,606,130 B1* | 8/2003 | George | 348/744 |
| 6,934,422 B2 | 8/2005 | Hamza | |
| 7,142,258 B2 | 11/2006 | Shin et al. | |
| 7,154,512 B2 | 12/2006 | Greggain | |
| 7,196,741 B2* | 3/2007 | Hicks | 348/745 |
| 7,262,816 B2 | 8/2007 | McDowall et al. | |
| 7,359,575 B2 | 4/2008 | Bassi et al. | |
| 7,364,306 B2* | 4/2008 | Margulis | 353/31 |
| 7,474,799 B2 | 1/2009 | Bassi et al. | |
| 7,733,429 B2* | 6/2010 | Maxson et al. | 348/745 |
| 2004/0008198 A1 | 1/2004 | Gildred | |
| 2004/0156558 A1 | 8/2004 | Kim | |
| 2005/0219426 A1* | 10/2005 | Maxson et al. | 348/807 |

* cited by examiner

*Primary Examiner* — Kieu Oanh T Bui
(74) *Attorney, Agent, or Firm* — Dickstein Shapiro LLP; Kenneth S. Roberts

(57) ABSTRACT

In projection television (PTV) systems utilizing folded optical systems such as a rear projection CRT, DLP, LCD, or LCOS based televisions, or the like, an automatic geometric alignment (AGA) system including a first programmable logic, a second programmable logic operably coupled to the first programmable logic, and light sensors positioned in the over-scan region along the border of the screen and operably coupled to first programmable logic. In operation, the first programmable logic causes an on screen display (OSD) system to display and move test patterns on the screen and, using feed back data received from the light sensors, determines the geometric alignment and/or pin cushion effect error in the displayed test pattern. The second programmable logic, which includes deflection shaping circuitry to align, center or steer the beams from the projection systems, utilizes data received from the first programmable logic to compensate for geometric alignment error.

12 Claims, 4 Drawing Sheets

TELEVISION AUTOMATIC GEOMETRY ADJUSTMENT SYSTEM

FIELD OF THE INVENTION

The invention relates generally to projection television systems and more particularly to systems and methods for automatic geometry adjustment.

BACKGROUND INFORMATION

Projection television (PTV) systems in "nearly-flat" rear PTVs utilize folded-optical systems implemented by multiple-optical-path technologies (e.g. CRTS) or by single-optical-path technologies (e.g. DLP, LCD, or LCOS). The shallowness of the display's enclosure requires that the folded optical systems must be adjusted to maintain alignment of the images over the visible surface of the screen. Without proper adjustment, the images displayed on the screen by the folded-optical systems can appear shifted or rotated out of proper alignment, or exhibit a pin-cushion effect. To avoid misalignments or the pin-cushion effect, adjustments to alignment are made at the factory, but with age, temperature and other environmental conditions, or even with jostling of the unit during storage and shipping, it is often necessary to readjust the geometric alignment in the field in order to maintain the quality of the image on the screen over time or even out of the box.

Various types of alignment and convergence systems, both manual and automated, have been developed to handle the necessary adjustments. Manual systems tend to be labor intensive, tedious and extremely time consuming, requiring hours to complete. Because the manipulator must often have technical knowledge or training sufficient to execute the manual alignment and convergence corrections, abilities that ordinary PTV purchasers seldom possess, manual correction is typically accomplished by a skilled technician. In addition, because the manual procedure often requires the use of special test instruments, it may require the inconvenience of removing the PTV from the purchaser's home so that the adjustment can be made at a repair facility.

Although automated alignment and convergence systems tend to avoid the disadvantages associated with manual systems, they too have their limitations with respect to accuracy, speed, reliability and expense. One example of an automated system includes the use of a mechanically scanning optical head that samples certain predetermined areas of a projected test pattern. The various mechanical elements and motors of such a system tend to add to its cost and complexity while detracting from system reliability. In addition, convergence and alignment accuracy tends to be dependent on motor accuracy and the process still tends to require several minutes to complete.

Accordingly, it would be desirable to provide an inexpensive automated geometric alignment system that reliably achieves geometric alignment over the entire screen without increasing the complexity and cost of the system.

SUMMARY

The present invention is directed to systems and methods that facilitate automatic geometric alignment in projection television (PTV) systems utilizing folded optical systems such as a rear projection CRT, DLP, LCD, or LCOS based televisions, or the like. In a preferred embodiment, the automatic geometric alignment (AGA) system preferably includes a first programmable logic, a second programmable logic operably coupled to the first programmable logic, and light sensors positioned in the over-scan region along the border of the screen and operably coupled to first programmable logic. In operation, the first programmable logic causes an on screen display (OSD) system to display and move test patterns on the screen and, using feed back data received from the light sensors, determines the geometric alignment error in the displayed test pattern. The second programmable logic, which includes deflection shaping circuitry to align, center or steer the beams from the projection systems, utilizes data received from the first programmable logic to compensate for geometric alignment error.

In a preferred embodiment of a television comprising an automatic geometric alignment (AGA) system, the AGA system preferably comprises a plurality of light sensors positioned about the borders of the screen on the bezel of the enclosure in the over-scan region. The plurality of light sensors is coupled to the first programmable logic depicted preferably in the form of a digital module (DM). The DM is coupled to a second programmable logic depicted preferably in the form of a geometry alignment module and the television's on screen display (OSD) controller, which is also coupled to the geometry alignment module. Both the OSD controller and the geometry alignment module are coupled to the television's projection engine, which is operably coupled to the screen.

The AGA system can be activated at the "power on" stage or during the transition to the "power off" state, after a predetermined amount time of television operation, and/or upon user activation.

In operation, the AGA process includes turning off the geometry alignment module and video input from the geometry alignment module to the projection, and projecting a test pattern on the display screen and over-scan region. The test patterns, which preferably comprise a plurality of dots arranged in a predetermined pattern, are incrementally moved until detected by the light sensors. This step is preferably repeated to accumulate the data necessary to calculate or determine the amount of misalignment due to image shift or rotation, i.e., determine the $\Delta x$, the $\Delta y$, and $\Delta \Theta$, and/or calculate or determine the amount of misalignment or distortion due to a pin cushion effect. The geometry alignment and video input are then turned back on and the geometric alignment of an image is corrected or compensated based on these values.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The systems and methods described herein provide for automatically aligning geometry in folded optics projection television systems such as a CRT, DLP, LCD or LCOS based projection systems or the like. More particularly, the automatic geometric alignment (AGA) system preferably includes a first programmable logic for generating and moving a test pattern to determine geometric misalignment, a plurality of light sensors located in the over-scan region along the border of the screen on the interior of the enclosure to sense light beams projected from an image projection engine, and a second programmable logic to align, center or steer the beams from the projection engine.

Figure 1:
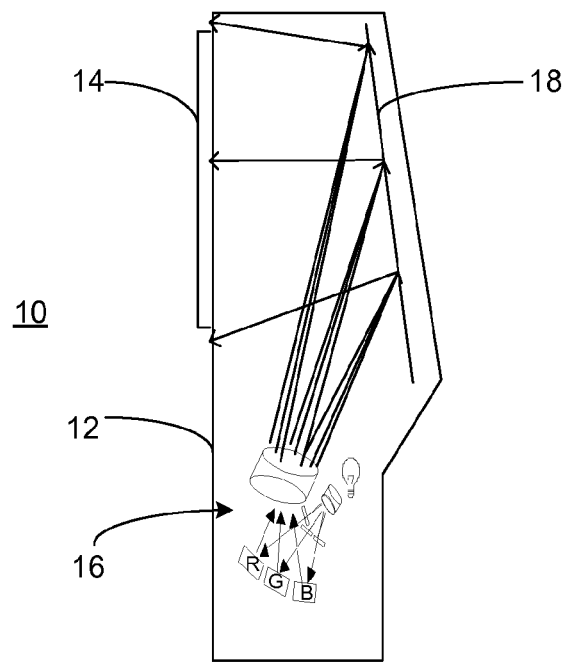
FIG. 1 depicts a side view of a projection television (PTV).
Figure 2:
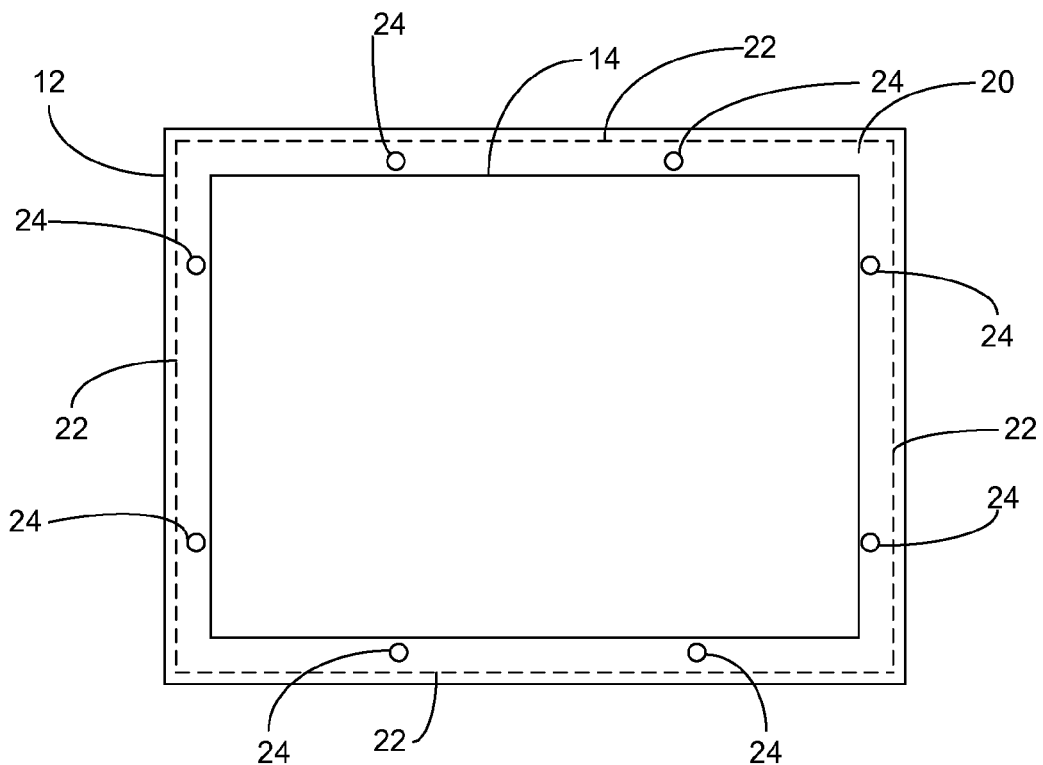
FIG. 2 depicts a plan view of a projection screen and bezel of the enclosure of the PTV shown in FIG. 1 viewed from the rear of the screen from inside of the enclosure.

Turning in detail to the figures, FIG. 1 depicts a PTV 10 comprising a cabinet or enclosure 12, an image projection engine or system 16, e.g., a CRT, DLP, LCD or LCOS based projection engine or the like, a projection screen assembly 14 attached to the front of the cabinet 12, and a mirror 18 mounted in the interior of the cabinet 12 and optically coupled to the projection screen assembly 14 and the image projection engine 16. As depicted in FIG. 2, all PTVs typically have an over-scan area 22 around the borders of the screen 14 on the bezel 20 of the enclosure 12 and onto which an image is projected beyond the borders of a screen 14.

Figure 3:
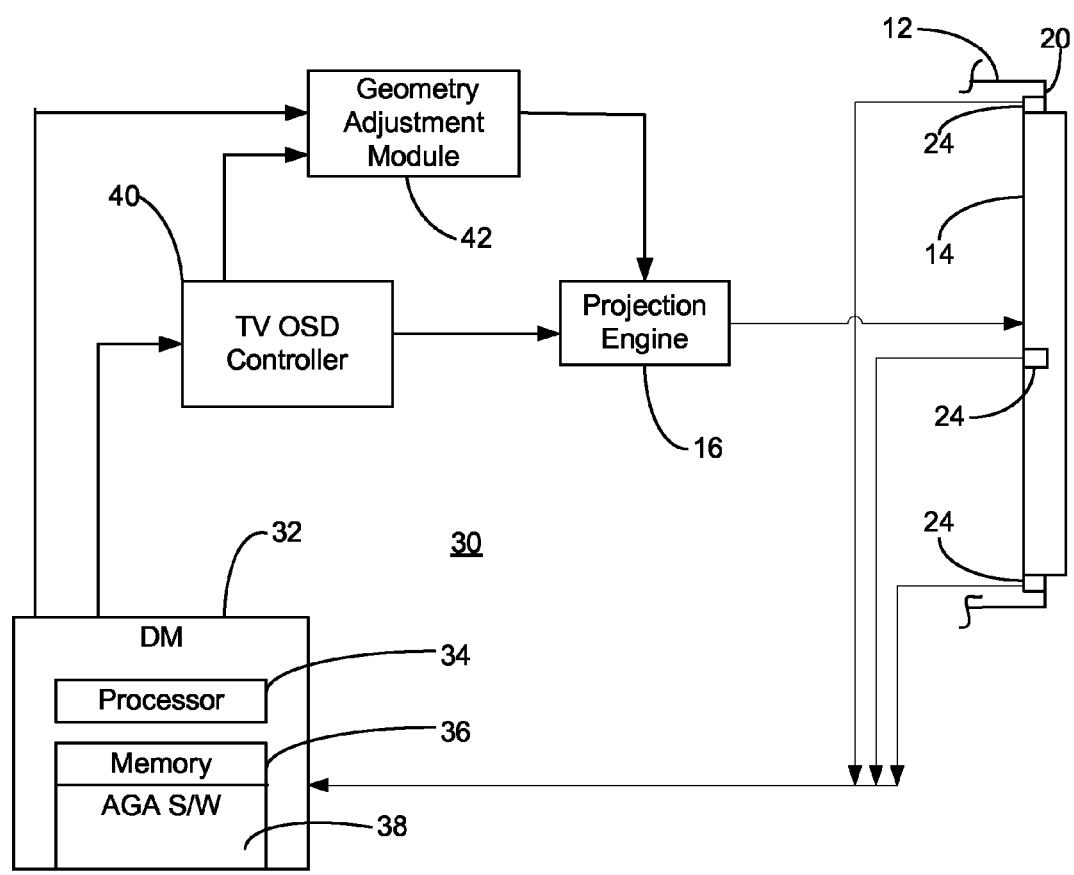
FIG. 3 depicts a schematic of an automatic geometric alignment system.

Referring to FIG. 3, a preferred embodiment of a television comprising an automatic geometric alignment (AGA) system 30 is shown. As depicted, the AGA system 30 comprises a plurality of light sensors 24 positioned about the borders of the screen 14 on the bezel 20 of the enclosure 12 in the over-scan region 22. The plurality of light sensors 24 are coupled to a first programmable logic depicted as a digital module (DM) 32. The DM 32 is coupled to a second programmable logic depicted as a geometry alignment module 42 and the television's on screen display (OSD) controller 40, which is also coupled to the geometry alignment module 42. Both the OSD controller 40 and the geometry alignment module 42 are coupled to the television's projection engine 16, which is operably coupled to the screen 14.

The DM 32 preferably comprises a microprocessor chip 34, preferably a system on a chip processor such as the AMD Xilleon™ processor chip, non-volatile memory 36 and automatic geometric alignment (AGA) software 38 stored in the memory 36. The AGA software 38 includes a set of instructions used to retrieve test patterns from memory 36, or in the case of the Xilleon™ chip, retrieve test patterns stored in memory on the Xilleon™ chip, causes the projection of the test patterns onto the screen 14 and over-scan area 22, and determines the amount of rotation, shift or pin cushion effect causing misalignment or pin cushion distortion of the test pattern.

The DM 32 uses the television's OSD controller 40 to project the test pattern 50 onto the screen 14 and move the test pattern to determine the amount of misalignment. During testing, the OSD controller 40 directs the test pattern images directly to the projection engine 16. During non-test operation, the OSD controller 40 directs all images through the geometry alignment module 42 for geometry alignment compensation based on the misalignment and distortion data determined by the AGA software.

The geometry alignment module 42 is preferably incorporated as part of the television's signal processing application (SPA) module and may comprise software that includes a set of instructions to enable geometric alignment correction based on the misalignment and/or distortion data determined by the AGA software or, more preferably, comprises a microprocessor chip such as a Silicon Optix GEO chip or other processor chip comprising geometry correction capability.

The automatic geometric alignment system can be activated the "power on" stage or during the transition to the "power off" state, after a predetermined amount time of television operation, and/or upon user activation.

Figure 4A:
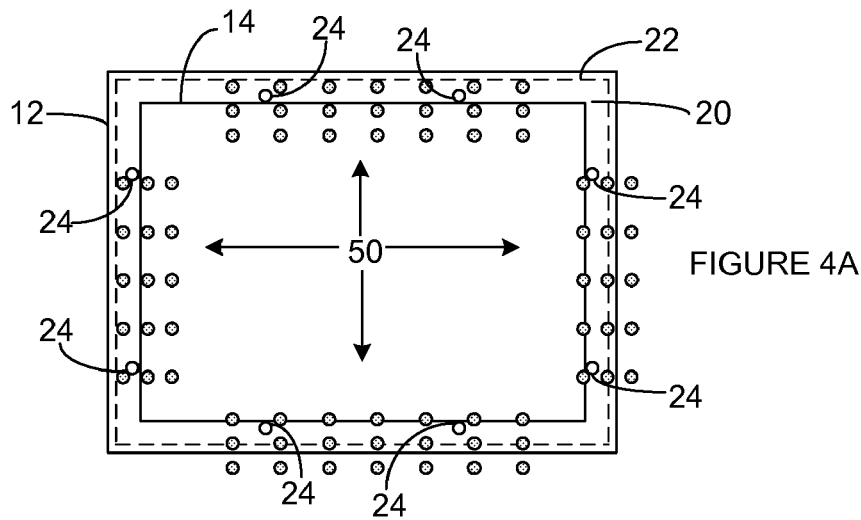
FIGS. 4A, 4B and 4C depict plan views of a projection screen and bezel of the enclosure of the PTV shown in FIG. 1 viewed from the rear of the screen from inside of the enclosure with test patterns projected thereupon.
Figure 4B:
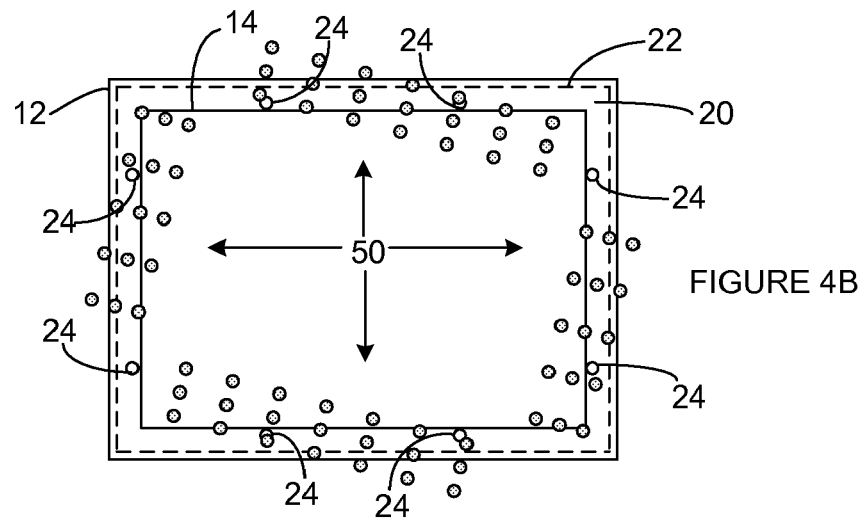
Figure 4C:
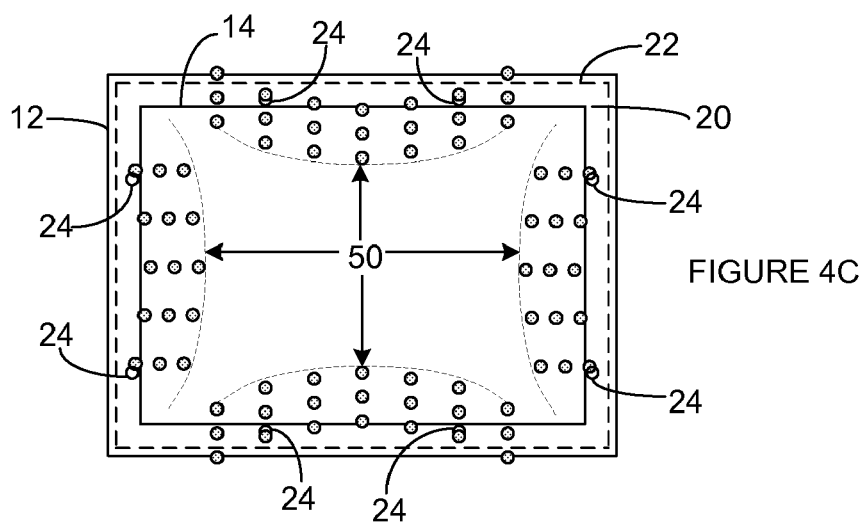
Figure 5:
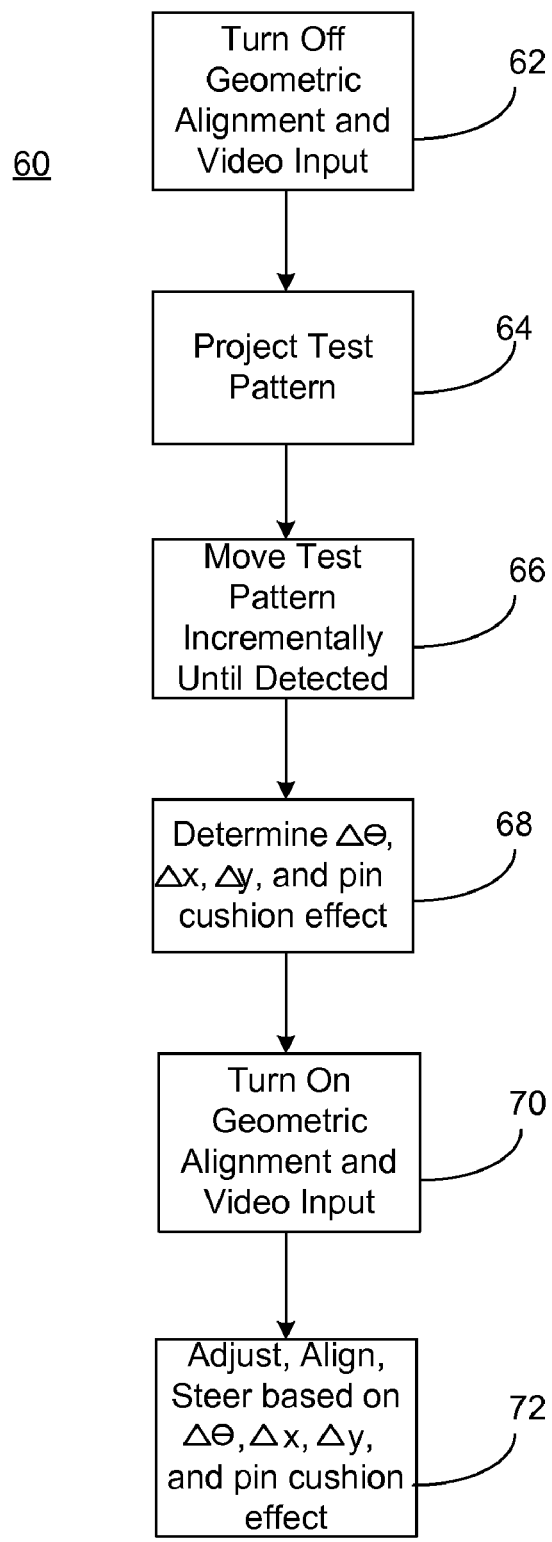
FIG. 5. depicts a flow chart illustrating a preferred embodiment of an automatic geometric alignment process

In operation, as depicted in FIG. 5, the automatic geometric alignment process 60 includes at step 62 turning off the geometry alignment module and video input from the geometry alignment module to the projection engine, and, at step 64, projecting a test pattern on the display screen and over-scan region. As depicted in FIGS. 4A, 4B and 4C, the test pattern 50 preferably comprises a plurality of dots arranged in a predetermined pattern. FIG. 4A shows image misalignment due to a shifting of the test pattern 50, while FIG. 4B shows image misalignment due to a rotation of the test pattern 50. FIG. 4C, however, shows misalignment or distortion of the test pattern 50 due to a pin cushion effect.

Referring to FIG. 5, at step 66, the test pattern is incrementally moved until detected by the light sensors preferably in a direction that would cause detection before the test pattern becomes visible in the screen area, i.e., the test patterns preferably move from the edge of an active bitmap inwards and stop being moved when detected. This step is preferably repeated as necessary to accumulate the data necessary to calculate or determine, at step 68, the amount of misalignment due to image shift or rotation, i.e., determine the $\Delta x$, the $\Delta y$, and $\Delta \Theta$, and/or calculate or determine the amount of misalignment or distortion due to a pin cushion effect. The geometry alignment and video input are then turned back on at step 70 and, at step 72, the geometric alignment of an image is corrected or compensated based on the values determined at step 68 and, thus, the image is adjusted, aligned and steered based on these compensation values.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. An projection television with automatic geometric alignment comprising
    an enclosure,
    a display screen positioned within the enclosure,
    a plurality of light sensors positioned in an over-scan region in the enclosure along the border of the screen,
    a first programmable logic operably coupled to the plurality of light sensors, a second programmable logic operably coupled to the first programmable logic, and an on screen display (OSD) system coupled to the first programmable logic and operably coupled to the screen, wherein the first programmable logic is configured to cause the OSD system to display and incrementally move a test pattern from the edge of an active bitmap inwards until detected by the light sensors and determine geometric alignment error in the displayed test pattern from feed back data received from the light sensors, wherein the test pattern comprises a plurality of dots arranged in a predetermined pattern, and wherein the second programmable logic is configured to align, center or steer light beams projected onto the screen and to utilize geometric alignment error data received from the first programmable logic to compensate for geometric mis-alignment in the light beam projections.

2. The projection television of claim 1 further comprising a projection system operably coupled to the screen and coupled to the first and second programmable logics.

3. The projection television of claim 1 wherein the first programmable preferably comprises a microprocessor chip, non-volatile memory, and automatic geometric alignment software stored in the non-volatile memory and executable on the microprocessor chip.

4. The projection television of claim 3 wherein the microprocessor chip is a system on a chip processor.

5. The projection television of claim 3 wherein the software comprises a set of instructions cause the OSD system to display and move test patterns on or adjacent the screen and determine geometric alignment error in the displayed test pattern from feed back data received from the light sensors.

6. An projection television with automatic geometric alignment system comprising an enclosure, a display screen positioned within the enclosure, a plurality of light sensors positioned in an over-scan region in the enclosure along the border of the screen, a digital module coupled to the plurality of light sensors, a geometric alignment module coupled to the digital module, and an on screen display (OSD) system coupled to the digital module and the geometric alignment module, a projection system operably coupled to the screen and coupled the OSD system and the geometric alignment module, wherein the digital module is configured to cause the OSD system to display and incrementally move a test pattern from the edge of an active bitmap inwards until detected by the light sensors and determine geometric alignment error in the displayed test pattern from feed back data received from the light sensors, wherein the test pattern comprises a plurality of dots arranged in a predetermined pattern, and wherein the geometric alignment module is configured to align, center or steer light beams projected onto the screen and to utilize geometric alignment error data received from the first programmable logic to compensate for geometric mis-alignment in the light beam projections.

7. The projection television of claim 6 wherein the digital module comprises a microprocessor chip, non-volatile memory, and automatic geometric alignment software stored in the non-volatile memory and executable on the microprocessor chip.

8. The projection television of claim 7 wherein the microprocessor chip is a system on a chip processor.

9. The projection television of claim 7 wherein the software comprises a set of instructions cause the OSD system to display and move test patterns on or adjacent the screen and determine geometric alignment error in the displayed test pattern from feed back data received from the light sensors.

10. A geometric alignment process for a projection television projecting a test pattern on a display screen and over-scan region about the screen, wherein the test pattern comprises a plurality of dots arranged in a predetermined pattern, incrementally moving the test pattern from the edge of an active bitmap inwards until detected by a plurality of light sensors positioned about the periphery of the screen, calculating the amount of misalignment of the test pattern image, and correcting the geometric alignment of an imaged based on the calculated misalignment.

11. The process of claim 10 wherein the misalignment is due to one of shift, rotation, or pin cushion.

12. The process of claim 10 further comprising the steps of turning off geometric alignment while calculating geometric misalignment of the test pattern and turning back on the geometric alignment of an image and correcting the geometric alignment based on the misalignment data of the test pattern.

* * * * *